Patented June 4, 1940

2,202,877

UNITED STATES PATENT OFFICE 2,202,877

ANTIOXIDANTS AND PETROLEUM OILS CONTAINING THE SAME

Donald R. Stevens, Swissvale, and William A. Gruse, Wilkinsburg, Pa., assignors to Gulf Oil Corporation, Pittsburgh, Pa., a corporation of Pennsylvania No Drawing. Application April 12, 1937, Serial No. 136,504

14 Claims. (Cl. 44—9)

This invention relates to antioxidants and to petroleum oils containing the same, said antioxidants comprising tri-alkylated mono-hydroxy phenols represented by the following structural formula:

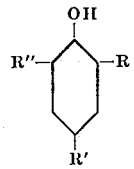

wherein R, R' and R" represent alkyl ($C_nH_{2n+1}$) groups, and wherein at least one of the alkyl groups in a position ortho to the hydroxyl (OH) group contains three or more carbon atoms, the total number of substituted alkyl groups being such that the compounds are insoluble in dilute aqueous alkali solution and in water, while soluble in hydrocarbon oils and serving as antioxidants when incorporated therein; all as more fully set forth hereinbelow and as claimed.

Raw cracked distillates made from petroleum oils by pyrolytic methods, and certain polymerized gasolines made by polymerization of normally gaseous hydrocarbons, contain certain undesirable constituents which are subject to oxidational changes, with resultant formation of gums and color-imparting bodies. Unless treated for the removal of such undesirable bodies or unless such oxidational changes are inhibited, such gasolines tend to deposit gums upon evaporation and to deposit gums and discolor in storage and in handling. The elimination of these undesirable constituents or obviation of their effects has presented an important problem to the petroleum industry. This problem has tended to increase due to the fact that modern methods for producing gasoline tend in general to produce raw gasoline products containing considerable quantities of these constituents, for example, di-olefins, as well as considerable quantities of desirable olefinic materials which contribute value to gasoline and which should not be removed in treating.

The undesirable constituents referred to have long been removed from gasoline by chemical treating methods, such, for example, as washing with sulfuric-acid. Sulfuric-acid refining is, however, no longer satisfactory in many instances on account of the high treating losses which are thereby incurred. In another method of refining, raw gasoline is contacted at elevated temperatures, either in the vapor phase or in the liquid phase, with a solid adsorbent catalyst, such as fuller's earth or the like, which exerts a more or less selective effect upon the undesirable gum-forming compounds in the gasoline boiling-point range, polymerizing them to higher boiling bodies which may readily be removed from the gasoline by fractional condensation and distillation methods. In many instances, however, such clay-treating fails to produce a treated product sufficiently free from the undesired gum-forming bodies present in the original raw gasoline, or is less satisfactory than the use of inhibitors.

In recent years the problem of preventing the deposition of gum from gasoline has been attacked from a different angle. It has been found that small quantities of certain chemicals, when added to a motor fuel, posses the property of preventing or inhibiting the formation of gums. A large number of these compounds, now known as antioxidants or gum inhibitors, have been developed and have been used either alone or in conjunction with known treating methods, in preparing gasoline for the market. However, many of these chemicals are not desirable adjuncts to a motor fuel and those which have proved to be sufficiently effective and reasonably satisfactory from other standpoints are expensive. Some of the most active materials for this purpose are subject to the disadvantage that they are soluble in water and in dilute caustic, so that gasoline to which they have been added tends to be deprived of the antioxidant material upon contact with water, and it is not feasible to add such antioxidant agents prior to washing the gasoline with dilute alkali solution in the ordinary manner. It is known that the sooner the antioxidant is added the better, so that there is usually a definite advantage in adding antioxidant prior to washing the gasoline with alkali in the usual manner.

Aside from gasoline, other petroleum oils, such as lubricating oils, turbine oils, transformer oils, and the like, are also subject to undesirable oxidational changes in storage and in use, which result in definite deterioration of quality and character of these oils. Even the most drastic refining methods will not serve to remove from these oils all tendency toward such deterioration and it is therefore desirable to provide antioxidants capable, when added to these oils, of retarding or inhibiting such undesirable oxidational changes.

Our invention, therefore, as aforesaid, relates to a class of materials having the property of serving as antioxidants or gum-inhibitors for petroleum oils and having the advantages of cheapness, solubility in petroleum oils of various kinds and insolubility in water and dilute aqueous alkali solution.

In our prior application, Serial No. 578,412, filed December 1, 1931, now U. S. Patent No. 2,001,634, we described and claimed the refining of cracked distillates by treating them with anhydrous aluminum chloride and various oxygen-containing organic bodies, including phenols. In our application Serial No. 591,928, filed February 19, 1932, now U. S. Patent No. 2,017,610, we described the refining of petroleum distillates by treating the same with a mixture of sulfuric acid and a hydroxylated aromatic compound such as a phenol. We found, in the practice of the processes described in the aforesaid application, that at least a considerable part of the desired effect was due to the formation of certain antioxidant bodies. In our applications Serial Nos. 649,670, filed Dec. 30, 1932 and 702,258, filed Dec. 13, 1933, now U. S. Patent No. 2,061,111, we described and claimed the manufacture of antioxidants and the addition thereof to motor fuels, which antioxidants are obtained by treating low-boiling cracked distillates or low-boiling fractions thereof with aryl-hydroxy compounds such as phenols, the treatment being usually conducted at relatively low temperatures in the presence of acid condensing agents such as sulfuric acid or aluminum chloride, or at relatively high temperatures in the absence of a condensing agent. Thus, in our application Serial No. 702,258, we described treating cracked gasoline containing low boiling constituents such as are commonly present in cracked gasoline as produced, and including, of course, such olefins as propylene and the butylenes, with various phenols, including phenol itself, cresols and xylenols, in the presence of acid condensing agents or in the absence of such condensing agents under heat and pressure, thereby forming antioxidant bodies which were separated by distillation from the treated gasoline and then used after separation as antioxidants for addition to hydrocarbon oils of various kinds. In our co-pending application, Serial No. 110,014, filed November 9, 1936, which is a division of our prior application Serial No. 702,258, we have described and claimed antioxidants as thus prepared and hydrocarbon oils containing the same.

After considerable research we have now succeeded in identifying the chemical character of certain of the antioxidant products formed in accordance with the processes set forth and described in our previously filed application referred to hereinabove and inherently present in the antioxidant materials representing the final products of such processes. We have found that certain of these compounds (particularly those containing alkyl-substitution groups having three or four or more carbon atoms, especially in secondary or tertiary linkages) which we are now able to identify, as well as others closely related to them in chemical structure and constitution, are extremely effective in themselves as antioxidants, whether isolated or not, and that they may be prepared by means of other processes than those described in our previously filed applications.

This application is therefore directed to certain compounds of the character indicated, for use as antioxidants, particularly for petroleum oils, either in isolated form or in admixture with other materials which may or may not be antioxidants and regardless of the manner in which these compounds are formed. These compounds are alike in having good antioxidant properties, varying somewhat as between themselves and for different oils, and in being insoluble in water and dilute alkali solution, and are prepared in general by alkylating monohydroxy phenols, such as phenol, certain cresols and xylenols, and certain alkali-soluble alkylated phenols of relatively simple structure, with olefins, especially propylene, butylenes, amylenes and higher boiling olefins.

We have found, as indicated hereinabove, that those compounds are most advantageous which consist of 2,4,6-tri-alkylated mono-hydroxy phenols having in a position ortho to the hydroxyl group at least one alkyl substitution group having three or more carbon atoms, e. g. a propyl, butyl, amyl, or higher alkyl group. The remaining alkyl groups may be similar or different, e. g., methyl, ethyl, or higher alkyl groups.

Compounds of this class have definite advantages over other alkylated phenols. Thus, mesitol (2,4,6-tri-methyl-phenol), while fairly active as an antioxidant, is difficult to prepare in an inexpensive and simple manner and is soluble in dilute alkali. If the methyl substitution group which in mesitol occupies the position para to the hydroxy group, is replaced by a higher alkyl group, little or no improvement in this respect is obtained; the resulting compound (2,6-dimethyl-4-tertiary-butyl-phenol) is soluble in dilute alkali and is not particularly effective as an antioxidant for cracked gasoline. Moreover, the particular xylenol (2,6-di-methyl-phenol) from which the last-mentioned compound is derived is not present in commercial tar acids and is relatively expensive, although now available to a limited extent.

We have found that when at least one of the methyl groups present in mesitol in a position ortho to the hydroxyl group is replaced by an alkyl group, having three or more carbon atoms, especially one connected to the ring through a secondary or tertiary linkage, the resulting compound is highly effective as an antioxidant, and is insoluble in dilute alkali; thus, 2-tertiary-butyl-4,6-di-methyl-phenol is a good gum inhibitor for gasoline and is insoluble in dilute alkali. Similarly, 2,6-di-tertiary-butyl-4-methyl-phenol and 2,4,6-tri-tertiary-butyl-phenol are extremely effective inhibitors, are insoluble in dilute alkali and are cheaply and simply prepared.

In the class of compounds set forth hereinabove, in which the 2-, 4- and 6- positions are occupied by substituted alkyl groups (the original OH group of the phenol being in each case considered as being in the 1- position; and which general class excludes phenolic derivatives having more than one hydroxyl group and phenolic derivatives having substitution groups other than those of the hydroxyl and alkyl types) it will be obvious that there are a large number of individual compounds varying between themselves in specific properties and in their effectiveness as antioxidants to some extent, but all possessing in common the property of insolubility in dilute alkali solution. Thus one group within this general class comprises tri-alkylated phenols having two methyl groups in the ortho and para positions, respectively, with respect to the hydroxyl group, the other ortho position being occupied by an alkyl group containing three or more carbon atoms per molecule; this alkyl group may be a propyl, butyl, amyl or higher alkyl group and it may be connected to the carbon link through a linkage or normal, secondary or tertiary type, although when produced in accordance with the processes set forth in our applications referred to hereinabove, linkages of secondary and tertiary types predominate. As examples of this class, we may cite 2-isopropyl-4,6-di-methyl-phenol, 2-tertiary-butyl-4,6-di-methyl-phenol, 2-secondary-butyl-4,6-di-methyl-phenol, and 2-tertiary-amyl-4,6-di-methyl-phenol. These compounds may all be prepared from that xylenol in which the methyl groups occupy positions ortho and para, respectively, to the hydroxyl group, (namely, 1-hydroxy-2,4-di-methyl-benzene) by alkylation with the appropriate olefin such as propylene, butylene, amylene or the like.

A second group of compounds comprises those tri-alkylated phenols within the general class indicated, in which both of the substituted groups ortho to the hydroxyl group consist of alkyl groups having three or more carbon atoms. As examples within this second group we may cite 4-methyl-2,6-di-isopropyl-phenol; 4-methyl-2,6-di-tertiary-butyl-phenol; 4-methyl-2,6 di-tertiary amyl phenol; 2,6-di-tertiary-amyl-4-tertiary-butyl-phenol; and 2,6-di-tertiary-butyl-4-tertiary-amyl-phenol. Of these the first three may be made by alkylating p-cresol with propylene, iso-butylene and tri-methyl-ethylene, respectively, the fourth may be prepared by alkylating para-tertiary-butyl-phenol with tri-methyl ethylene, and the fifth may be prepared by alkylating para-tertiary-amyl-phenol with isobutylene.

A third group of compounds comprises those tri-alkylated phenols in which the 2-, 4- and 6-positions are all occupied by alkyl substitution groups having three or more carbon atoms. As examples of this sub-class we may mention 2,4,6-tri-isopropyl-phenol; 2,4,6-tri-tertiary-butyl-phenol; and 2,4,6-tri-tertiary-amyl-phenol. These may be prepared from phenol by alkylation with propylene, isobutylene and trimethyl-ethylene, respectively. In addition to these examples, in which the three alkyl groups are all identical, we may mention those in which the alkyl groups, while all containing three or more carbon atoms, are different as between themselves; for example, 2-tertiary-butyl-4,6-di-tertiary-amyl-phenol. It will be obvious that a considerable number of additional compounds may be prepared within this group as in the other groups mentioned, and that there is some overlapping between groups, due to the definitions thereof.

The simplest and cheapest compounds are those derived from phenol, cresols and xylenols, and in which only one or two types of alkyl groups are present.

Our invention does not comprise all of the compounds, antioxidant or otherwise, prepared in accordance with the processes set forth in our above-mentioned prior applications but is limited to those having alkyl substitution groups in the 2,4, and 6-positions, with at least one or both of the alkyl groups ortho to the hydroxy group, or all three of the alkyl groups, being alkyl groups containing three or more carbon atoms. Consequently, as phenolic raw materials for the preparation of these compounds, insofar as the processes set forth in the foregoing applications are concerned, we are limited to phenol, ortho-cresol, para-cresol, 2,4-di-methyl-phenol, ortho-butyl-phenol, para-butyl-phenol, ortho-amyl phenol, para-amyl-phenol and other mono- and di-substituted mono-hydroxy phenols in which the substituted group or groups occupy an ortho or para position, or both, relative to the hydroxy group. Meta-cresol, having a methyl group in the 3-position, cannot be used as a starting material, and such xylenols as 2,6-di-methyl-phenol will not, upon alkylation in the manner set forth in our previously filed applications, yield any compound falling within the class of compounds comprehended by this invention.

We have found that the solubility or insolubility of alkylated monohydric phenols in dilute alkali solution and the antioxidant value of these compounds are influenced and determined not only by the number and complexity of the substituted alkyl groups but also by the positions in which the various alkyl groups are located relative to the hydroxyl group. In general, an increase in the number of substituted carbon atoms tends to increase solubility in hydrocarbon oil, without particular reference to the positions in which the alkyl groups are substituted. However, the solubility of the alkylated phenols in dilute aqueous alkali solution is largely influenced by the alkyl groups substituted in the 2- and 6-positions, i. e., ortho to the hydroxyl group. An increase in the number of carbon atoms present in the alkyl groups substituted in the 2- and 6-positions tends to produce what has sometimes been referred to as a "krypto" effect, a stereo-chemical effect which tends to shield or protect the hydroxyl group, making it less susceptible to reaction with alkali, and consequently tending to make the compound insoluble in dilute aqueous alkali solution.

We have found that, in alkyl-substituted monohydroxy phenols, when the sum of the number of carbon atoms present in the alkyl groups occupying the positions ortho to the OH group is 4 or more, the compound is insoluble in dilute caustic solution. Thus, 2,4,6-tri-tertiary-butyl-phenol and 2,4,-di-methyl-6-propyl-phenol are both insoluble in dilute caustic solution. On the other hand, mesitol (2,4,6,-tri-methyl-phenol) and 2,6-di-methyl-4-tertiary-butyl-phenol are both soluble in dilute caustic solution. The two last-mentioned compounds are removed from gasoline containing them when such gasoline is washed with dilute caustic, and even to some extent by water washing; the compounds within the field of our invention are not.

In the following table, we have compared the alkali-solubilities and antioxidant values of a number of compounds both within and without the field of our present invention:

*Table I*

| Compound | Solubility in dilute alk. solution | Antioxidant values for gasoline |
| --- | --- | --- |
| (1) 2, 4, 6-tri-methyl phenol | Soluble | Good. |
| (2) 2, 4, 6-tri-tertiary-butyl-phenol | Insoluble | Do. |
| (3) 2, 4-di-methyl-6-tertiary-butyl-phenol | do | Excellent. |
| (4) 2, 6-di-tertiary-butyl-4-methyl-phenol | do | Best found. |
| (5) 2, 6-di-tertiary-amyl-4-methyl-phenol | do | Good. |
| (6) 2, 6-di-methyl-4-tertiary-butyl-phenol | Soluble | Poor. |

Of the compounds listed above, those numbered (2), (3), (4) and (5) are within the field of our invention; the two others are not.

It will be observed that with reference to the compounds listed in the above table, those within the field of our invention are all insoluble in dilute alkali and are good antioxidants, while the other two are soluble in dilute alkali and one is a poor antioxidant. It should be noted that the comparison of antioxidant values given in Table I is on the basis of a single type of gasoline; slightly different relative values may be obtained for different gasolines. Moreover, that compound which is the best antioxidant for gasoline may or may not be the best antioxidant for a transformer oil or a lubricating oil.

Referring now to the preparation of these materials, we find, that with respect to olefinic starting materials, ethylene is somewhat too stable, and the ethyl-phenols are less suitable as antioxidants, although the compounds within the class stated may contain one or two ethyl substitution groups when a higher alkyl group is also present. Ethylene is not ordinarily present to any appreciable extent in cracked gasoline. On the other hand, propylene, the butylenes (especially isobutylene) and the amylenes (especially tri-methyl ethylene) are satisfactory olefinic starting materials, either alone or in admixture with other hydrocarbons. Cracked gasoline as normally produced, and the heavier of the hydrocarbons usually found as vapors in cracking-still gases (these being sometimes called "wild" products), contain varying quantities of these olefins as well as higher olefins and may be used as starting materials. On the other hand, the olefins may be used in isolated form or in admixture with other closely related olefins and paraffins. For example, so-called "debutanizer" gas, consisting largely of butane and butylenes, may be employed as a starting material, as may propylene, isobutylene and tri-methyl-ethylene themselve It will be readily understood that when it desired to prepare individual compounds within the class specified, free or substantially free from other compounds within the class, the raw materials should be selected with that aim in view and should not comprise mixtures of olefins or mixtures of various phenols except in those instances in which the natures of the individual products permit easy isolation and separation after alkylation. As to mixtures of olefins and paraffins, however, it may be remarked that the presence of the corresponding or other paraffins has no effect upon the operation other than to reduce the concentration of the olefin. Thus, in the manufacture of 2,4,6-tri-tertiary-butyl-phenol we may employ as a starting material a mixture of butane and isobutylene; the butane does not enter into the reaction with the phenol.

When the compounds within the class defined are to be employed as antioxidants or gum inhibitors for gasoline and other light hydrocarbon oils, it is ordinarily preferred to use as olefinic starting materials olefins containing from 3 to 5 carbon atoms per molecule, thus obtaining propyl, butyl or amyl substitution groups. The resultant compounds may also be employed as antioxidants for higher boiling oils, such as lubricating oils, turbine oils and transformer oils. For these oils more advantageous results may also sometimes be obtained by utilizing the higher olefins having 6 or more carbon atoms per molecule and yielding alkylated phenols in which the number of carbon atoms in the alkyl substitution groups, or some of them, are correspondingly high.

In general, the methods set forth in our prior applications referred to hereinbefore may be employed for the preparation of the antioxidants forming the subject matter of this invention, with due regard to the selection of the raw materials.

Thus at temperatures up to 180° F. or thereabouts and under atmospheric or moderately elevated pressures, the usual condensing agents are employed, including sulfuric acid, phosphoric acid, anhydrous aluminum chloride, boron tri-fluoride, ferric chloride, hydrogen chloride and the like. Sulfuric acid is ordinarily most satisfactory by reason of its efficiency and cheapness. The amount of acid condensing agent required is relatively small with respect to the amount of phenol; in some instances the amount of acid condensing agent required is as little as 1 per cent of the phenol or less, being in such instances present in catalytic amounts. In using sulfuric acid as the condensing agent, and when it is desired to utilize the olefin efficiently, it is usually better to employ the acid in an amount equal to not less than about 3 per cent of the phenol. More than 10 per cent of the condensing agent, on the phenol, is not ordinarily worthwhile. At higher temperatures and pressures, for example from about 400° to 575° F. or higher, and 1000 pounds per square inch or somewhat higher, condensing agents are sometimes unnecessary and may be omitted, as set forth for example in our application Serial No. 702,258. In certain instances, intermediate temperatures, of say 180° to 400° F., especially up to 300° F., with pressures up to 1000 pounds per square inch, are advantageous, even when operating in the presence of catalysts; as for example in reacting propylene with a phenol. The temperatures should not be so high as to cause decomposition of the phenol employed. It is ordinarily advantageous to avoid temperatures and pressures so high that the product obtained will predominate in polymerized olefins, the formation of which is enhanced by heat and pressure.

The reactions involve no special difficulties, the reacting ingredients being simply contacted in the usual manner, either continuously or in batch operation. After completion of the reaction, the products are usually washed with an aqueous solution of caustic soda or other equivalent alkali, the strength of the washing solution being preferably not over 15 per cent. This washing operation removes any remaining acid material and also removes any unreacted phenolic starting material as well as alkylation products in which the alkylation has proceeded to a point less than desired. For example, in the manufacture of 2,4,6-tri-tertiary-butyl-phenol from isobutylene and phenol, minor amounts of mono- and di-tertiary-butyl-phenols are produced. These products are soluble in dilute alkali and may be readily removed in this manner. Water washing may also be resorted to wherever desired. In some cases it may be feasible to defer the alkali washing until after the crude antioxidant has been added to the gasoline or other oil.

The final products may be distilled, under ordinary pressure or under vacuum, and recrystallized in the usual manner to remove extraneous products such, for example, as olefin polymers and isomeric phenyl ethers, which may be formed to some extent during the reaction, and to obtain substantially pure products. Other concentration methods may also be employed where suitable, for example, extraction with alcoholic potash.

While the methods set forth in our previously filed applications are generally applicable for the preparation of the materials described and claimed herein, other methods of synthesizing these compounds may be resorted to when desired. For example, 2,4,6-tri-tertiary-butyl-phenol may be prepared from 2,4-di-tertiary-butyl-phenol by reaction with tertiary butyl chloride in the presence of metallic sodium, as set forth hereinbelow. Other methods of synthesis applicable to the various compounds will doubtless suggest themselves to those skilled in the art.

The following examples will serve to illustrate and exemplify our invention.

*Example 1.*—In this example, 2,4,6-tri-tertiary-butyl-phenol was prepared from phenol and isobutylene gas in the presence of sulfuric acid. We find it advantageous to employ ordinary concentrated sulfuric acid in amounts corresponding to from 3 to 5 per cent by weight of the phenol employed; with this concentration the rate of condensation is sufficiently high, while with higher amounts of acid the tendency toward polymerization of the isobutylene is increased. We may also state that we find it advantageous in obtaining a major proportion of the desired product in the total products of reaction to maintain the reaction temperature at about 50° C. during the first period of condensation, until the condensation products form a magma or mush, after which we find it desirable to raise the temperature enough to retain the reaction mass in a more or less liquid condition, thereby facilitating contact between the reacting materials.

Thus, 500 parts by weight of phenol (USP) and 25 parts by weight of commercial concentrated sulfuric acid were introduced into a suitable reaction vessel provided with a gas inlet and a gas outlet, suitable agitating means, and a coil for heating or cooling the contents of the reaction vessel. Isobutylene was then bubbled through the phenol, which was maintained at a temperature of 50° C., with agitation, until the reaction mixture took on the appearance of a magma, when the temperature was raised to 100° C. In this example the pressure was atmospheric.

After the reaction had been substantially completed, as indicated by the fact that the reaction mixture no longer gained in volume and by the flow of isobutylene at the gas exit, the flow of gas was stopped. The reaction mixture was washed with water until neutral. It was then distilled in a column under 10 mm. pressure. The lower boiling fractions thus obtained consisted largely of para-tertiary-butyl-phenol and 2,4-di-tertiary-butyl-phenol while the remaining fraction consisted almost entirely of 2,4,6-tri-tertiary butyl-phenol boiling at 140° C. under 10 mm. pressure. This fraction amounted to approximately 65 per cent of the total washed reaction product. On cooling, this fraction solidified to white crystals having a melting point of 130° to 131° C. After crystallization from alcohol the following constants were obtained for the substituted pure product:

| | Found | Theoretical data for 2:4:6-tri-tertiary-butyl-phenol |
|---|---|---|
| Melting point, °C | 130–131 | |
| Ultimate analysis, percent by weight: | | |
| Carbon | 82.35 | 82.44 |
| Hydrogen | 11.40 | 11.45 |
| Oxygen | 6.25 | 6.11 |
| Boiling point, °C.: | | |
| At 10 mm | 140 | |
| At 742 mm | 266–270 | |

As an alternative method of procedure, the reaction product may be washed with dilute aqueous caustic soda solution to separate the mono- and di-tertiary-butyl-phenols, distillation and recrystallization otherwise proceeding as indicated.

The product obtained in accordance with the foregoing example is an excellent gasoline antioxidant, readily and cheaply prepared, insoluble in water and in dilute caustic solution, and having a high antioxidant effect, as indicated by a standard oxygen stability test (Hunn, Fisher & Blackwood, J. Soc. of Automotive Engineers, Vol. 26, page 31, 1930), in which the stability of the fuel against oxidation is measured in terms of induction period and the higher values indicate the more stable fuels.

In determining the antioxidant value of this compound as well as the other compounds referred to hereinbelow, standard reference fuels were employed, for example, a refinery gasoline obtained by blending pressure distillate, reformed naphtha distillate and straight-run gasoline. The reference fuels employed were uninhibited by the addition of other antioxidants and contained no lead tetra-ethyl. Two standard reference fuels of the character indicated, when tested by the stability test referred to hereinbefore, showed induction periods or stability periods of 1¼ and 1½ hours, respectively. The same fuels, when inhibited by the addition of 0.04 gram of 2,4,6-tri-tertiary-butyl-phenol, prepared as indicated above, per 100 cc. of the fuel, were found to have induction periods of 5½ and 6½ hours, respectively, indicating a marked increase in stability toward formation of gums.

The same compound was found to serve as an excellent antioxidant for turbine oils and other oils of higher boiling points than gasoline, as was determined by comparing the characteristics of a reference oil and an oil containing added antioxidant by a standard testing method. Moreover, the same product was found to restrain oxidation of such highly refined oils as the so-called "white oils," medicinal oils and agricultural spray oils, when added thereto in small amount, as determined by a standard test indicating the behavior of such oils when exposed to sunlight. The same compound when incorporated in amounts between 0.1 and 0.5 per cent in highly refined automotive lubricating oils, exerted a marked antioxidant effect, stabilizing the lubricants against color changes and other deterioration when subjected to temperatures corresponding to those to which such oils are subjected in actual use.

*Example 2.*—In this example 2,4,6-tertiary-butyl-phenol was prepared by a different method. 90.8 parts by weight of 2,4-di-tertiary-butyl-phenol were added to a solution of 10.5 parts by weight of metallic sodium in 89 parts by weight of absolute alcohol, after which 52 parts by weight of tertiary-butyl-chloride were added and the mixture was gently refluxed for twenty hours. After filtering off sodium chloride from the cooled mixture, the solid was washed thoroughly with absolute alcohol, the washings being added to the filtrate which was then concentrated under reduced pressure in a water bath at 63° C. to remove alcohol and any remaining tertiary-butyl-chloride. The residue was taken up with hexane, the hexane solution being first washed with 10 per cent aqueous sodium hydroxide solution and then with solutions of increasing concentrations of alkali, up to 40 per cent NaOH. Some alkali-soluble material was removed in the weak alkali washings. When the concentration of alkali reached 20 per cent the sodium salt of 2,4-di-tertiary-butyl-phenol began to precipitate. The alkali extraction was continued until no more precipitate was obtained, the solids being filtered off after each extraction and washed thoroughly with hexane. 63.1 parts by weight of 2,4-di-tertiary-butyl-phenol were recovered upon subsequent hydrolysis of the solid sodium salt. The alkaline washes did not remove the 2,4,6-tri-tertiary-butyl-phenol from solution with hexane.

After extraction, the hexane solution was washed free from alkali, the hexane was distilled off, and the residue, amounting to 21.9 parts by weight, was distilled at atmospheric pressure. The boiling range was 265° C. to 280° C. with the most of the fraction distilling below 271° C. The distillate solidified on cooling to an oily crystalline mass having a brilliant orange color, the yield being 15.8 parts by weight. After three crystallizations from alcohol, pure white crystals were obtained melting between 130° and 131° C. Further crystallization did not alter the melting point. These crystals were found to give constants substantially identical to those obtained for the product obtained in accordance with the process set forth under Example 1, and consist of substantially pure 2,4,6-tri-tertiary-butyl-phenol. The antioxidant and other properties of this product were, of course, found to be substantially identical with those of the product obtained in accordance with Example 1.

*Example 3.*—This example relates to a compound identified as 2,6-di-tertiary-butyl-4-methyl-phenol. In preparing this compound the operating procedure was in general the same as employed in Example 1. 500 parts by weight of para-cresol of a technical grade and 25 parts by weight of commercial concentrated sulfuric acid were reacted with isobutylene in an apparatus similar to that referred to hereinbefore under Example 1, the temperature of reaction being maintained at 70° C. After completion of the reaction, the flow of isobutylene was stopped and the reaction mixture was blown with steam and washed with hot water and weak alkali until neutral. There was obtained a yield of 87 per cent of an oil which upon cooling solidified to a light gray crystalline mass. Recrystallization from hot absolute alcohol gave white crystals having a melting point of approximately 67.5° C. and having an ultimate analysis corresponding extremely closely to the theoretical ultimate analysis calculated for 2,6-di-tertiary-butyl-4-methyl-phenol.

The compound prepared as indicated hereinabove, when added to a standard reference gasoline having an oxygen stability period of 1¼ hours, in an amount equal to 0.04 gram per 100 cc. of the gasoline, increased the induction period to 10½ hours, indicating an extremely satisfactory antioxidant effect, especially when viewed in the light of the cheapness and ease of preparation of the antioxidant, and in view of the fact that this compound is, as in the instances of the other compounds described and claimed herein, insoluble in water and in dilute caustic alkali solution.

This compound was tested as an antioxidant for turbine oil with extremely satisfactory results. The turbine oil employed in testing was an oil which has heretofore been considered as a commercially satisfactory product for the lubrication of steam turbines, although subject, as are other oils, to oxidational deterioration, and hence open to improvement in that respect. It was a paraffin base oil which had been highly refined to give the following characteristics.

Viscosity in seconds S. U. V.:
At 100° F_____ 150
At 130° F_____ 85
At 210° F_____ 43
Gravity A. P. I._____ 32.5
Flash (Cleveland open cup method)__°F__ 390
Fire test_____°F__ 460
Pour point_____°F__ 0
Color N. P. A_____ 1
Carbon residue_____ Trace We determined the tendency of this turbine oil to oxidize in use and compared this with the tendency toward oxidation of the same oil having incorporated therein a small amount of 2,6-di-tertiary-butyl-4-methyl-phenol, thus forming a more stable composition in accordance with our invention. The tendency toward oxidation was determined in both cases by a standardized method of testing steam turbine oils, being that of Rogers and Miller, (Ind. Eng., Chem. 19, 308, 1927), modified in that we controlled the supply of oxygen by metering to provide 5 liters per hour; we used a 400 gram sample instead of a 500 gram sample, and ran the test in the presence of 25 cc. of distilled water and in the presence of metallic iron and copper. The presence of water necessitated the provision of a reflux condenser to prevent loss from volatilization. About 3 feet each of fine iron wire and fine copper wire were submerged in the oil during the test.

In this test the deterioration of the oil, due to oxidation in the presence of water, iron, and copper, is measured in terms of neutralization numbers and steam emulsion numbers over a long period of time while the oil undergoing test is subjected to conditions of accelerated oxidation. The following table indicates the relatively high stability of our composition as compared to the inhibited oil:

*Uninhibited turbine oil*

| Time of test in hours | 0 | 68 | 210 | 353 |
|---|---|---|---|---|
| Neutralization No. | 0.06 | 0.10 | 0.76 | 4.11 |
| Steam emulsion No. | 49 | 175 | 225 | 135 |

*Same turbine oil containing 0.2% 2,6-di-tertiary-butyl-4-methyl-phenol*

| Time of test in hours | 0 | 68 | 210 | 353 | 522 |
|---|---|---|---|---|---|
| Neutralization No. | 0.06 | 0.10 | 0.09 | 0.09 | 0.12 |
| Steam emulsion No. | 49 | 24 | 24 | 30 | 10 |

The same compound was found to be an excellent antioxidant for transformer oil.

*Example 4.*—This example relates to a compound identified as 2,4-di-methyl-6-tertiary-butyl-phenol. In preparing this compound the general procedure was essentially the same as that described in Examples 1 and 3; 500 parts by weight of 2,4-di-methyl-phenol (BP 102°/20 mm.) were introduced into the reaction vessel with 25 parts by weight of commercial concentrated sulfuric acid and the temperature was then brought to and maintained at 70° C. Isobutylene gas was then passed through the vessel while the contents were subjected to agitation. The reaction proceeded vigorously with evolution of considerable heat, and cooling was necessary in order to maintain the reaction temperature at about 70° C. until toward the end of the reaction, when, the evolution of heat having ceased, it was necessary to apply some external heat to maintain the temperature.

After the reaction had been completed, the reaction products were washed hot with an equal volume of a weak aqueous caustic soda solution. The oily layer which separated upon washing was an amber colored syrupy liquid and upon distillation under 20 mm. pressure the greater part of it distilled over as a contact-boiling fraction at 111° C. This fraction of the distillate was a colorless syrupy liquid having a specific gravity of 0.9480 and a refractive index of 1.4960. The ultimate analysis of the product corresponded almost exactly to the theoretically calculated ultimate analysis for 2,4-di-methyl-6-tertiary-butyl-phenol.

The antioxidant value of this compound was determined by comparing the induction periods of a standard reference gasoline with and without the addition of a small amount of this compound. Whereas the reference gasoline alone gave an induction period of 1½ hours, the same fuel when inhibited by the addition of 0.04 gram of this compound per 100 cc. of the fuel gave an induction period of 9 hours.

*Example 5.*—This example also relates to the preparation of 2,4-di-methyl-6-tertiary-butyl-phenol. In this example, a high-pressure bomb was charged with 25 parts by weight of 2,4-di-methyl-phenol and 50 parts by weight of isobutylene, no catalyst being added. The bomb was sealed and heated to 200° C. for one hour. During this time the pressure rose to 900 pounds per square inch and then gradually fell to 850 pounds per square inch. After cooling and opening the bomb, 28 parts by weight of liquid were recovered, of which 4.5 parts by weight were found to be alkali soluble. The alkali-soluble material was acidified and 17 parts by weight of unreacted 2,4-di-methyl-phenol were recovered therefrom. This recovered unreacted material was then again treated with 50 parts by weight of isobutylene, in apparatus similar to that previously employed, the temperature being maintained at 250° C. for two hours. During this time, the pressure rose to 1,150 pounds per square inch and gradually fell to 1,100 pounds per square inch. From the products obtained in this second treatment, there were recovered an additional 4.5 parts by weight of alkali-insoluble material. The combined alkali insoluble portions were then subjected to vacuum distillation, the distillate coming over evenly at 86° C. under 6 mm. pressure. The distillate was found to be similar to the material prepared as set forth in Example 4, having substantially the same properties, although the antioxidant value was slightly lower, probably due to dilution with some isomeric 2,4-di-methyl-phenyl-tertiary-butyl-ether.

*Example 6.*—In this example 2,6-di-tertiary-amyl-4-methyl-phenyl was prepared by slowly adding 780 parts by weight of tri-methyl-ethylene to 500 parts by weight of para-cresol of a technical grade, in the presence of 25 parts by weight of commercial concentrated sulfuric acid. The apparatus was the same as that referred to in Examples 1 and 3 but in this case was provided with a reflux condenser. Considerable heat was evolved during the early stages of the reaction and some refluxing took place. After all of the tri-methyl-ethylene was added, the temperature gradually fell and some external heat was applied to maintain the temperature around 70° C. and thus encourage complete alkylation. After approximately 1 hour the reaction was complete and the reaction product was weathered to remove any unreacted amylene and any amylene polymers, by passing an inert gas through the mixture at slightly elevated temperatures. To the remaining mixture was added an equal volume of hot weak aqueous caustic soda solution, the mixture being agitated and then allowed to cool and separate. Upon discarding the aqueous layer there was obtained an oily layer consisting of a syrupy, amber-colored liquid. Upon distillation at a pressure of 7 mm. the greater portion of this mixture distilled over at a temperature of 160° C. The fraction boiling at this approximate boiling point under the pressure noted was a colorless syrupy liquid having a specific gravity of 0.9313 and a refractive index of 1.4950, and having an ultimate analysis corresponding to that calculated for 2,6-di-tertiary-amyl-4-methyl-phenol.

When 0.04 gram of this compound was added to 100 cc. of cracked gasoline having an oxygen stability period of 1½ hours, the oxygen stability period was increased to 7 hours.

Some improvement in operation may be effected by passing the tri-methyl ethylene in vapor form through the phenol-acid mixture.

*Example 7.*—This example relates to 2,4,6-tri-tertiary-amyl-phenol. In preparing this material, the apparatus employed consisted of a cylindrical reaction vessel having a gas inlet at the bottom and a gas outlet at the top, agitating means suitable for finely dividing the incoming gas, and a heating or cooling coil. The gas inlet was so arranged with respect to the agitating means that the incoming gases were finely divided immediately upon coming into contact with the liquid in the reaction vessel. The reaction was performed under atmospheric pressure; 500 parts by weight of pure phenol and 25 parts by weight of commercial sulfuric acid were introduced into the vessel and the mixture was brought to and maintained at about 70° C., at which temperature the phenolic mixture was liquid. Warm tri-methyl-ethylene was then slowly admitted as a gas through the gas inlet, with agitation, the introduction of the gas being continued until the volume of the reaction products and the character and amount of the exit gases indicated completion of the reaction. The reaction mixture was weathered by blowing it with an inert gas to volatilize and carry off any residual amylene or amylene polymers formed during the reaction. After weathering, the reaction product was washed with an equal volume of weak caustic soda solution, the resultant aqueous layer being discarded. The oily layer was an amber colored syrupy liquid which upon separation and distillation at 7 mm. pressure gave a constant boiling fraction. This fraction boiled at 136° C. under the reduced pressure noted and was found to be a colorless syrupy liquid having a specific gravity of 0.9258 and a refractive index of 1.4955. When 0.04 gram by weight of 2,4,6-tri-tertiary-amyl-phenol, prepared as set forth above, was added to 100 cc. of a standard reference gasoline having an oxygen stability period of 1¼ hours, the stability period was increased to 5¼ hours.

This compound was also tested as an antioxidant for agricultural spray oil. Thus, when an oil of this character, having a very pale color and a viscosity of 75 seconds S. U. V. at 170° F., was subjected to ultra-violet light for 16 hours under a Westinghouse type S-1 lamp at a temperature of 195° F., the acid number of the oil increased from 0.02 to 0.30; the oil developed an undesirable yellow color and a distinctly rancid odor. The same oil, inhibited by the addition of 0.1 per cent of 2,4,6-tri-tertiary-amyl phenol prepared as indicated above, when subjected to the same test, increased in acid number to only 0.12; the odor after test was decidedly improved over that of the inhibited oil, and substantially no change in color was observed.

*Example 8.*—This example relates to 2,6-di-tertiary-amyl-4-tertiary-butyl-phenol. This compound was prepared by introducing an excess of tri-methyl-ethylene into a mixture of 500 parts by weight of para-tertiary-butyl-phenol (M. P. 99° C.) and 25 parts by weight of commercial concentrated sulfuric acid at a temperature of about 70° C. As the reaction proceeded, the crystalline para-tertiary-butyl-phenol gradually disappeared until the reaction mixture was entirely liquid. At this point the temperature showed a tendency to fall and heating was required to maintain it at 70° C. After reaction, the mixture of the reaction products are washed with a weak aqueous soda solution, thereby recovering an oily layer consisting of an amber-colored syrupy liquid. Upon distillation at 70 mm. pressure, there was obtained a constant boiling fraction coming over at 117° C. under the pressure noted. This fraction was a colorless syrupy liquid having a specific gravity of 0.9276 (25°/4°) and a refractive index of 1.4960. When 0.04 gram of 2,6-di-tertiary-amyl-4-tertiary-butyl-phenol, prepared as described above, was added to 100 cc. of a standard reference gasoline having an oxygen stability period of 1¼ hours, the stability period was increased to 5¾ hours.

*Example 9.*—This example relates to 2,6-di-tertiary-butyl-4-tertiary-amyl-phenol. This compound was prepared by reacting 500 parts by weight of para-tertiary-amyl-phenol with iso-butylene gas in the presence of 25 parts by weight of commercial concentrated sulfuric acid at a temperature of about 70° C., in the manner described in the foregoing example. After washing the product with an equal volume of hot weak aqueous caustic soda solution, there was obtained an oily layer which upon distillation under a pressure of 6 mm. yielded a fraction boiling at 122° C. under this pressure, and consisting of a pure white syrupy liquid. This liquid upon being cooled to 0° C. solidified to a crystalline mass, the crystals being slightly wet with adherent liquid. After drying the crystals on absorbent paper, the crystals were recrystallized from alcohol, yielding a product having a melting point of 47.5° C., and showing an ultimate analysis corresponding almost exactly to the theoretical calculated for 2,6-di-tertiary-butyl-4-tertiary-amyl-phenol. When 0.04 gram of 2,6-di-tertiary-butyl-4-tertiary-amyl-phenol, prepared as indicated above, was added to 100 cc. of a standard reference gasoline having an oxygen stability period of 1½ hours, the stability period was increased to 5½ hours.

*Example 10.*—This example relates to 2,4-di-methyl-6-iso-propyl-phenol. This compound was prepared by reacting 25 parts by weight of 2,4-di-methyl-phenol, 1.25 parts by weight of concentrated sulfuric acid and 50 parts by weight of propylene in a high pressure bomb for one hour at 100° C. under 900 pounds per square inch pressure. After cooling, the products from the bomb were washed with a solution of 10 per cent caustic soda solution to remove unreacted xylenol. The alkali insoluble material was water washed and dried and a portion thereof was then distilled under vacuum (11 mm.). Upon distillation under vacuum, as aforesaid, the distillate was dissolved into two fractions, a fraction (A) coming over between 93° and 96° C. and a fraction (B) coming over between 113° and 115° C. The observed properties of these two fractions were as follows:

|  | Fraction (A) | Fraction (B) |
|---|---|---|
| Refractive index, at 20° C | 1.5038 | 1.5178 |
| Specific gravity, 25°/4° | 0.9345 | 0.9523 |
| Per cent carbon | 79.97 | 80.84 |
| Per cent hydrogen | 9.71 | 9.91 |

Inasmuch as 2,4-di-methyl-6-iso-propyl-phenol should theoretically contain 80.49 per cent carbon and 9.75 per cent hydrogen, it will be observed that the carbon-hydrogen analysis of both fractions fit the calculated values closely. However, fraction (A) was low in antioxidant value; 0.05 per cent of this material raised the oxygen stability period of a certain gasoline from 1¼ hours to only 2½ hours. This fraction is believed to consist largely of 2,4-di-methyl-phenol-iso-propyl-ether, an isomeric compound. Fraction B was considerably higher in antioxidant value; 0.05 per cent of this material raised the oxygen stability period of a certain gasoline from 1¼ hours to 5 hours. In this, as in most other instances where isomeric ethers are obtained along with the desired alkylated phenols, there is a wide difference between the boiling points of the two isomers, facilitating separation by distillation.

*Example 11.*—This example relates to 2,6-di-iso-propyl-4-methyl-phenol. This compound was prepared by reacting 25 parts by weight of para-cresol, 1.25 parts by weight of concentrated sulfuric acid and 50 parts by weight of propylene in a high pressure bomb at 150° C. under a pressure of 900 pounds per square inch. The liquid recovery, after cooling, indicated that the reaction was not complete. Consequently, the reaction was repeated with fresh starting materials, and the combined alkali-insoluble parts of the reaction products were again treated in the presence of sulfuric acid and excess propylene, at 150° C. and 900 pounds per square inch pressure. The yield again indicated that no additional propylene had been combined.

The resultant material was again alkali-washed to remove acid and cresol, and the alkali-insoluble portion was then distilled under vacuum. That portion coming over between 98° and 103° C. at 4 mm. pressure was found to have a refractive index (at 20° C.) of 1.5049 and a specific gravity of 0.9310, the carbon-hydrogen analysis of this material corresponding closely to the theoretical calculated for 2,6-di-iso-propyl-4-methyl-phenol. When 0.04 gram of this material was added to 100 cc. of a gasoline having (when uninhibited) an oxygen stability period of 1¼ hours, the oxygen stability period of the treated gasoline was raised to 3¾ hours. The other fractions, presumably consisting largely of an isomeric ether, had little or no antioxidant value.

*Example 12.*—This example relates to 2,4,6-tri-iso-propyl-phenol. This compound was prepared by reacting phenol with 5 per cent by weight of concentrated sulfuric acid and about 167 per cent by weight of propylene in a high pressure bomb for 1 hour at 150° C. During this period, the pressure arose to 680 pounds per square inch, falling to 530 pounds per square inch at the end of the period. That portion of the resultant material insoluble in dilute alkali was then re-treated with propylene and sulfuric acid as above, yielding a material which was entirely insoluble in dilute alkali solution.

This alkali-insoluble material was then distilled under vacuum. That fraction coming over between 102° and 104° C. at 4 mm. was found to have a refractory index of 1.4970 and a specific gravity of 0.9189, and to contain 81.43 per cent carbon and 10.72 per cent hydrogen, corresponding closely to the theoretical carbon and hydrogen contents calculated for 2,4,6-tri-iso-propyl-phenol. This material, when added in the amount of 0.05 per cent by weight to a cracked gasoline having an oxygen stability period of 1½ hours, raised the oxygen stability period to 3 hours.

The other fractions obtained upon distillation, and believed to consist largely of iso-propyl-phenyl-ethers, were of little or no antioxidant value. Their presence indicated that the final 2,4,6-tri-iso-propyl-phenol desired was obtained through a series of reactions in which alkyl aryl ethers are intermediates, and that the antioxidant value of the selected fraction may have been reduced to some extent by the presence of small amounts of isomeric 2,4-di-iso-propyl-phenyl iso-propyl-ether.

*Example 13.*—This example relates to 2,4-di-methyl-6-secondary-butyl-phenol. A mixture of 1-butene and 2-butene was prepared by dehydrating secondary butyl alcohol over activated alumina at 150° C., giving a mixture of these two butenes predominating in 2-butene. A mixture of 150 parts by weight of butenes, prepared as above, 25 parts by weight of 2,4-di-methyl-phenol and 1.25 parts by weight of concentrated sulfuric acid was heated for 1 hour in a high pressure bomb to a temperature of 150° C., developing a pressure of 2500 pounds per square inch. After cooling, the bomb was opened and the resultant liquid was weathered and washed with dilute alkali, giving a yield of 18.5 parts by weight. The material recovered from the alkali washings was re-treated with a further portion of the butene mixture, in the presence of sulfuric acid, giving a further yield of 9.5 parts by weight of alkali-insoluble material. The combined alkali-insoluble portions from the two runs were then vacuum distilled, giving two distinct fractions, one having a boiling point of 87° C. at 4 mm. and the second having a boiling range of 102° to 104° C. at 3 mm. The first of these fractions was found to have a low antioxidant value and was probably the isomeric 2,4-di-methyl-secondary-butyl-ether. The second fraction was found to have a refractive index of 1.4955, a specific gravity of 0.9517 and an ultimate analysis corresponding closely to that calculated for 2,4-di-methyl-6-secondary-butyl-phenol. When a portion of this second fraction was added to a cracked gasoline in the amount of 0.04 gram per 100 cc. of the gasoline, the oxygen stability period of the gasoline was raised from 1½ hours to 4¾ hours.

While we have described our invention hereinabove with respect to various specific illustrative examples, it will be obvious that our invention is not limited to the details of such examples, but may be variously practiced and embodied within the scope of the claims hereinafter made. It will also be understood that our invention is not limited to the use, as antioxidants, of isolated compounds of the class described, but contemplates also the use of these compounds in admixture with other compounds of the same class, as well as other materials of an entirely different character, wherever this proves desirable.

What we claim is:

1. A new composition of matter, comprising a hydrocarbon oil containing constituents which, when uninhibited, normally tend to undergo oxidational changes resulting in deterioration of said oil, and a small quantity, sufficient to restrain or inhibit such change, of a compound represented by the structural formula:

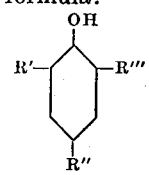

wherein $R'$, $R''$ and $R'''$ represent alkyl substitution groups, at least one of which, occupying a position ortho to the OH group, contains 3 or more carbon atoms.

2. A new composition of matter, comprising a hydrocarbon oil containing constituents which, when uninhibited, normally tend to undergo oxidational changes resulting in deterioration of such oil, and a small quantity, sufficient to restrain or inhibit such change, of a compound represented by the structural formula:

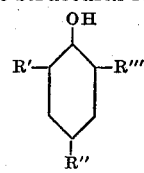

wherein $R'$ represents an alkyl substituent of the class consisting of the iso-propyl, secondary butyl, tertiary butyl, secondary amyl and tertiary amyl groups, and $R''$ and $R'''$ represent alkyl groups having from 1 to 5 carbon atoms.

3. A new composition of matter comprising a hydrocarbon oil containing constituents which, when uninhibited, normally tend to undergo oxidational changes such as those resulting in formation of gums and the like, and a small quantity, sufficient to restrain or inhibit such change, of a compound represented by the structural formula:

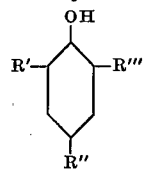

wherein $R'$, $R''$ and $R'''$ represent alkyl substituents each of which is a member of the class consisting of the iso-propyl, secondary butyl, tertiary butyl, secondary amyl and tertiary amyl groups.

4. A new composition of matter comprising a hydrocarbon oil containing constituents which, when uninhibited, normally tend to undergo oxidational changes such as those resulting in formation of gums and the like, and a small quantity, sufficient to restrain or inhibit such change, of a compound represented by the structural formula:

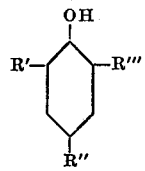

wherein $R'$ and $R'''$ represent alkyl substituents each of which is a member of the class consisting of the iso-propyl, secondary butyl, tertiary butyl, secondary amyl and tertiary amyl groups, and R" represents an alkyl group having from 1 to 5 carbon atoms.

5. A motor fuel comprising a hydrocarbon oil boiling within a gasoline boiling point range and containing constituents which, when uninhibited, normally tend to undergo oxidational changes such as those resulting in formation of gums and the like, and a small quantity, sufficient to restrain or inhibit such change, of a compound represented by the structural formula:

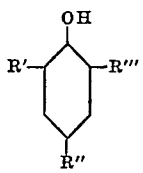

wherein R', R" and R''' represent alkyl substituents each of which is a member of the class consisting of the iso-propyl, secondary butyl, tertiary butyl, secondary amyl and tertiary amyl groups.

6. A motor fuel comprising a hydrocarbon oil boiling within a gasoline boiling point range and containing constituents which, when uninhibited, normally tend to undergo oxidational changes such as those resulting in formation of gums and the like, and a small quantity, sufficient to restrain or inhibit such change, of a compound represented by the structural formula:

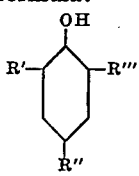

wherein R' represents an alkyl substituent of the class consisting of the iso-propyl, secondary butyl, tertiary butyl, secondary amyl and tertiary amyl groups and R" and R''' represent alkyl groups each having 1 to 5 carbon atoms.

7. A motor fuel comprising a hydrocarbon oil boiling within a gasoline boiling point range and containing constituents which, when uninhibited, normally tend to undergo oxidational changes such as those resulting in formation of gums and the like, and a small quantity, sufficient to restrain or inhibit such change, of a compound represented by the structural formula:

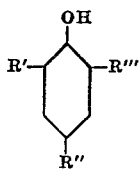

wherein R' and R''' represent alkyl substituents each of which is a member of the class consisting of the iso-propyl, secondary butyl, tertiary butyl, secondary amyl and tertiary amyl groups and R" represents an alkyl group having 1 to 5 carbon atoms.

8. A motor fuel comprising a hydrocarbon oil boiling within a gasoline boiling point range and containing constituents which, when uninhibited, normally tend to undergo oxidational changes such as those resulting in formation of gums and the like, and a small quantity, sufficient to restrain or inhibit such change, of 2,4,6-tri-tertiary-butyl-phenol.

9. A motor fuel comprising a hydrocarbon oil boiling within a gasoline boiling point range and containing constituents which, when uninhibited, normally tend to undergo oxidational changes such as those resulting in formation of gums and the like, and a small quantity, sufficient to restrain or inhibit such change of 2,4-di-methyl-6-tertiary butyl-phenol.

10. A motor fuel comprising a hydrocarbon oil boiling within a gasoline boiling point range and containing constituents which, when uninhibited, normally tend to undergo oxidational changes such as those resulting in formation of gums and the like, and a small quantity, sufficient to restrain or inhibit such change, of 2,6-di-tertiary-butyl-4-methyl-phenol.

11. A motor fuel comprising a hydrocarbon oil boiling within a gasoline boiling point range and containing constituents which, when uninhibited, normally tend to undergo oxidational changes such as those resulting in formation of gums and the like, and a small quantity, sufficient to restrain or inhibit such change, of a compound represented by the structural formula:

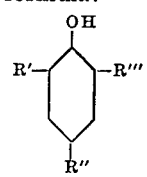

wherein R', R" and R''' represent alkyl groups having 1 to 5 carbon atoms each, R' and R''' being different alkyl groups and containing a total of from 4 to 10 carbon atoms.

12. A new composition of matter comprising a hydrocarbon oil containing constituents which when uninhibited normally tend to undergo oxidational changes resulting in deterioration of said oil and a quantity, sufficient to restrain or inhibit such changes, of an oil soluble monohydroxy-phenol-olefin condensation product insoluble in water and in dilute aqueous alkali solution and having the property of retarding undesirable oxidational changes in hydocarbon products, comprising a 2,4,6-tri-alkylated monohydroxy-phenol, the total of the carbon atoms in the alkyl groups in the positions ortho to the hydroxyl group being at least 4.

13. A new composition of matter comprising a hydrocarbon oil containing constituents which when uninhibited normally tend to undergo oxidational changes resulting in deterioration of said oil and a quantity, sufficient to restrain or inhibit such changes, of an oil soluble monohydroxy-phenol-olefin condensation product insoluble in water and in dilute aqueous alkali solution and having the property of retarding undesirable oxidational changes in hydrocarbon products, comprising a 2,4,6-tri-alkylated-monohydroxy-phenol having at least one alkyl substitution group containing three or more carbon atoms in a position ortho to the hydroxyl group.

14. A new composition of matter comprising a hydrocarbon oil containing constituents which when uninhibited normally tend to undergo oxidational changes resulting in deterioration of said oil and a quantity, sufficient to restrain or inhibit such changes, of the fraction insoluble in dilute aqueous alkali of the products formed by the condensation of a monohydroxy phenol with hydrocarbon constituents boiling below 190° F. normally present in cracked petroleum distillate and containing a 2,4,6-tri-alkylated monohydroxy phenol having a total of at least four carbon atoms in the alkyl groups ortho to the hydroxyl group.

DONALD R. STEVENS.
WILLIAM A. GRUSE.